United States Patent [19]
Tsuchida et al.

[11] Patent Number: 5,117,308
[45] Date of Patent: May 26, 1992

[54] LENS SYSTEM USING UNHOMOGENOUS MEDIA

[75] Inventors: Hirofumi Tsuchida; Norihiko Aoki; Kimiaki Yamamoto, all of Tokyo, Japan

[73] Assignee: Olympus Optical Co., Ltd., Tokyo, Japan

[21] Appl. No.: 711,895

[22] Filed: Jun. 7, 1991

[30] Foreign Application Priority Data

Jun. 8, 1990 [JP] Japan ................. 2-148598

[51] Int. Cl.⁵ .................. G02B 3/00; G02B 15/14
[52] U.S. Cl. ........................ 359/654; 359/683
[58] Field of Search ............. 350/413, 423, 427; 359/683, 654

[56] References Cited

U.S. PATENT DOCUMENTS

| | | | |
|---|---|---|---|
| 4,639,094 | 1/1987 | Aono | 350/413 |
| 4,755,039 | 7/1988 | Hattori | 350/413 |
| 4,762,403 | 8/1988 | Hattori | 350/413 |

FOREIGN PATENT DOCUMENTS 63-124011  5/1988  Japan.

OTHER PUBLICATIONS

Atkinson et al.; "Design of a Gradient-Index Photographic Objective"; Applied Optics, vol. 21, pp. 993-998, Mar. 15. 1982.

Primary Examiner—Scott J. Sugerman
Attorney, Agent, or Firm—Cushman, Darby & Cushman

[57] ABSTRACT

A lens system comprising, at locations in the vicinity of each other, radial type graded refractive index lens elements made of a medium having a positive refractive power and other radial type graded refractive index lens elements made of a medium having a negative refractive power. This lens system has aberrations corrected favorably with the radial type graded refractive index lens elements which are made of materials easily preparable.

4 Claims, 5 Drawing Sheets

LENS SYSTEM USING UNHOMOGENOUS MEDIA

BACKGROUND OF THE INVENTION a) Field of the invention

The present invention relates to a lens system which uses unhomogenous media.

b) Description of the prior art

As a photographic lens system which is used with cameras and so on, there is known, for example, the Gauss type lesns system. This lens system has defects that it is composed of a large number of, i.e., 6 to 7 lens elements and requires a high manufacturing cost, and that is has a large external design.

It is conceivable, for correcting these defects, to use aspherical lens elements. However, the number of the lens elements can hardly be corrected even by using the aspherical lens elements since these lens elements are incapable of correcting Petzval's sum and chromatic aberration though they are effective for correcting spherical aberration, coma, distortion, etc.

In contrast, attempts are made to correct aberrations by adopting the graded refractive index lens elements which have refractive indices varying from portion to portion thereof. Especially, the radial type graded refractive index lens element which has a refractive index distribution in the radial direction can correct the spherical aberration, etc., like the aspherical lens element, and additionally the Petzval's sum and chromatic aberration at the same time.

Figure 11:
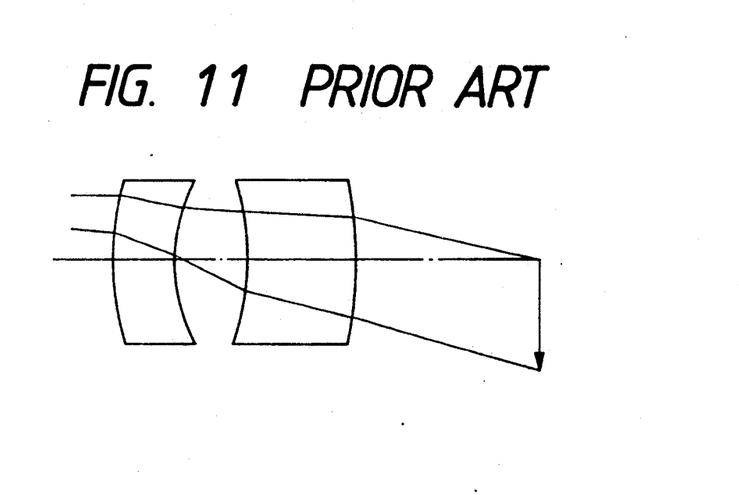
FIG. 11 shows a sectional view illustrating the composition of the conventional lens system.

A lens system using the radial type graded refractive index lens elements is described on pages 993 and later, Vol.21 of the Applied Optics. This lens system is designed so as to correct the aberrations favorably and comprise lens elements in a number smaller than ⅔ of the number of the lens elements arranged in an ordinary lens system composed only of homogenous lens elements, by using the radial graded refractive index lens elements which have a concave shape (thicker at the marginal portion than at the portion on the optical axis), and are made of a medium having a positive refractive index and arranged symmetrically with regard to an aperture stop as illustrated in FIG. 15.

When the distance as measured from the optical axis in the direction perpendicular to the optical axis is represented by y, the refractive index of the lens portion located at the radial distance y is designated by n(y), the refractive index of the lens portion located on the optical axis is denoted by $N_0$ and the refractive index distribution coefficients are represented by $N_1, N_2, \ldots$, the refractive index distribution of the radial type graded refractive index lens element is expressed by the following formula (A):

$$n(y) = N_0 + N_1 y^2 + N_2 y^4 + \ldots \quad (A)$$

Since the radial type graded refractive index lens element having the refractive index distribution expressed by this formula has the refractive index distribution coefficients which are different dependently on wavelengths, the coefficients representing dispersing power distribution (Abbe's numbers) of the lens element are expressed as follows:

$$v_i = N_{id}/(N_{iF} - N_{iC}) \quad (i = 1, 2, \ldots) \quad (B)$$

$$v_0 = (N_{0d} - 1)/(N_{0F} - N_{0C})$$

wherein the reference symbols $N_{id}$, $N_{iF}$ and $N_{iC}$ represent the refractive power distribution coefficients for the d-line, F-line and C-line respectively. $V_0$ is the same as the Abbe's number of the homogenous glass material. Further, out of $v_i$'s, $v_1$ is the coefficient expressing paraxial amount of the chromatic aberration.

According to the literature mentioned above, when a lens system having a fixed focal length is composed of two radial type graded refractive index lens elements, aberrations are corrected as described below:

Aberrations are classified into seven types, i.e., Seidel's five types of aberrations, longitudinal chromatic aberration and lateral chromatic aberration. Out of these aberrations, the curvature of field is corrected by designing the lens elements so as to have a concave shape and selecting a medium having a positive refractive power for the lens elements, the spherical aberration is corrected by selecting adequate values for the refractive index distribution coefficients of the second and higher orders, and the longitudinal chromatic aberration is corrected by selecting an adequate value for the dispersing power distribution coefficient $v_1$. Further, the astigmatism is corrected by selecting adequate widths for the airspaces reserved between the radial type graded refractive index lens elements and the aperture stop, whereas the rest aberrations, i.e., coma, distortion and lateral chromatic aberration are corrected by arranging the lens elements symmetrically with regard to the aperture stop so that the aberrations produced before the aperture stop are cancelled with those produced after the aperture stop.

Since the longitudinal chromatic aberration is corrected by selecting an adequate value for the dispersing power distribution coefficient $v_1$ for the glass material, this aberration cannot be corrected favorably unless the value of $v_1$ is adequately selected.

Now, description will be made on the relationship between values of $V_1$ and amounts of the chromatic aberration to be produced.

According to the literature mentioned above, the longitudinal chromatic aberration PAC to be produced by the medium is expressed by the following formula (C):

$$PAC \propto \phi m/V_1 \quad (C)$$

wherein the reference symbol $\phi m$ represents the refractive power of the medium.

For convenience of the description that follows, let us classify values of $v_1$ into the following three regions:

(a) $0 < v_1 < v_0$
(b) $v_0 < V_1$
(c) $v_1 < 0$ wherein the reference symbol $v_0$ represents the Abbe's number of the radial type grade refractive index lens element as measured on the optical axis, which ordinarily has a value on the order of 20 to 70.

Within the region (a), $v_1$ has a small positive value and chromatic aberration is produced remarkably when rays are refracted by the medium. The graded refractive index lens elements currently available are mostly made of media which have Abbe's numbers within this range. Within the region (b), $v_1$ has a large positive value and chromatic aberration is produced little when rays are refracted by the medium. In order to obtain the lens system described in the literature mentioned above, it is necessary to use a glass material having an Abbe's number within this range (b). It is very difficult to manufacture a lens element which has a large difference in refractive index by using a glass material having an Abbe's number within this range (b). Within the range (C), $v_1$ has a negative value and chromatic aberration is produced on the side opposite to the normal side.

As is understood from the description made above, it is difficult to correct the longitudinal chromatic aberration by using graded refractive index lens elements which are made of the glass material having a value of $v_1$ within the region (a) and can be manufactured easily. As a lens system which has longitudinal chromatic aberration corrected favorably by using graded refractive index lens elements made of the glass materials having values of $v_1$ within the region (a), there is known the lens system disclosed by Japanese Patent Kokai Publication No. Sho 63-124011. This lens system uses two radial type graded refractive index planar lens elements which have different values of $v_1$ and are cemented to each other. However, this lens system cannot correct the other aberrations simultaneously though it corrects the longitudinal chromatic aberration favorably.

SUMMARY OF THE INVENTION

A primary object of the present invention is to provide a lens system having chromatic aberration and the other aberrations corrected favorably by using radial type graded refractive index lens elements which have refractive index distributions in the radial direction, can be manufactured easily and produce a remarkable amount of chromatic aberration.

The lens system according to the present invention comprises two lens units, i.e., a first lens unit and a second lens unit, each of which consists of a combination of a radial type graded refractive index lens element made of a medium having a positive refractive power and another radial type graded refractive index lens element made of a medium having a negative refractive power, each of said graded refractive index lens elements being designed so as to satisfy the following condition (1):

$$0 < v_1 < v_0 \qquad (1)$$

wherein the reference symbols $v_0$ and $v_1$ represent the coefficients representing the dispersing powers of each of the graded refractive index lens elements.

The lens system according to the present invention is characterized in that it uses the graded refractive index lens elements which are made of glass materials having the coefficients representing the dispersing powers of values within the above-mentioned region (a) so as to satisfy the above-mentioned condition (1).

When a refractive power is imparted to the medium of a radial graded refractive index lens element, the longitudinal chromatic aberration is produced. When both the chromatic aberration produced by the medium and that produced by the surface of the radial type graded refractive index lens element are considered correctively, the total longitudinal chromatic aberration PAC to be produced by the radial type graded refractive index lens element is expressed by the following formula (D):

$$PAC \propto (\phi_m/v_1) + (\phi_s/v_0) \qquad (D)$$

wherein the reference symbol $\phi_s$ represents the refractive power of the surface only of the radial type graded refractive index lens element.

The graded refractive index lens element which has a value of $v_1$ within the region (a) and can easily be manufactured at the present time has a small value of $v_1$ around 10 and therefore produces very remarkable longitudinal chromatic aberration. On the other hand, when $v_0$ has a value of 20 to 70, the longitudinal chromatic aberration produced by the surface is not so remarkable as is understood from the formula (D).

In case of a lens system having a positive refractive power, it is conceivable to design the radial type graded refractive index lens elements so as to have a concave shape (thicker on the optical axis than at the marginal portion) and select a positive refractive power for the medium of the lens elements so as to cancel the longitudinal chromatic aberration produced by the medium of the radial type graded refractive index lens elements with that produced by the surfaces thereof. However, the chromatic aberration produced by the surfaces is less than the chromatic aberration produced by the medium and can hardly cancel the latter aberration completely. Further, when too strong refractive powers are imparted to the surfaces, it will be impossible to correct astigmatism, curvature of field and other aberrations.

When radial type graded refractive index lens elements which have values of $v_1$ within the above-mentioned region (a) are to be used in the lens system according to the present invention, a radial type graded refractive index lens element made of a medium having a negative refractive power is arranged in the vicinity of a radial type graded refractive index lens element made of a medium having a positive refractive power so that the chromatic aberration produced by the medium having the positive refractive power is cancelled with the chromatic aberration produced by the medium having the negative refractive power. When the radial type graded refractive index lens element made of the medium having the negative refractive power is arranged in the vicinity of the radial type graded refractive index lens element made of the medium having the positive refractive power as described above, remarkable longitudinal chromatic aberration is produced by the radial type graded refractive index lens element made of the medium having the positive refractive power, but the radial type graded refractive index lens element made of the medium having the negative refractive power has a high function to correct the aberration, whereby the chromatic aberration is corrected favorably in the lens system as a whole.

It is more desirable that the lens system according to the present invention described above is designed so as to satisfy the following conditions (2) and (3):

$$|(\phi_{pm}/v_{1p}) + (\phi_{nm}/v_{1n})|/|\phi_t| < 0.1 \qquad (2)$$

$$d \cdot |\phi_t| < 0.1 \qquad (3)$$

wherein the reference symbol $\phi_{pm}$ represents the refractive power of the medium of the radial type graded refractive index lens element made of the medium having the positive refractive power which is arranged in the lens system composed of the combination of the two lens elements, the reference symbol $\phi_{nm}$ designates the refractive power of the medium of the radial type graded refractive index lens element made of the medium having the negative refractive power, the reference symbol $v_{1p}$ denotes the coefficient representing the dispersing power of the radial type graded refractive index lens element made of the medium having the positive refractive power, the reference symbol $v_{1n}$ represents the coefficient representing the dispersing power of the radial type graded refractive index lens element made of the medium having the negative refractive power, the reference symbol $\phi_t$ designates the total refractive power of the lens system composed of the combination of the two lens elements, and the reference symbol d denotes the airspace to be reserved between the two lens elements in the lens system composed of the combination of the two lens elements.

The condition (2) is required for favorably correcting the longitudinal chromatic aberration, and defines the positive and negative refractive powers of the media. If the condition (2) is not satisfied, the longitudinal chromatic aberration will undesirably be undercorrected or overcorrected.

The condition (3) defines the airspace to be reserved between the radial type graded refractive index lens element made of the medium having the positive refractive power and the radial type graded refractive index lens element made of the medium having the negative refractive power which are to be used in the lens system composed of said combination.

If the condition (3) is not satisfied, these two lens elements will occupy a large space, thereby undesirably enlarging the lens system according to the present invention. Further, height of ray will be largely different between these two lens elements, whereby chromatic aberration will not be corrected sufficiently even when the condition (2) is satisfied and, in addition, the aberrations other than the longitudinal chromatic aberration will be remarkably influenced, thereby producing an effect undesirable from the viewpoint of correction of the aberrations.

When the two lens elements are cemented to each other, d has a value of 0 in the condition (3).

When the two radial type graded refractive index lens elements are combined as described above, the lens system composed of this combination can have a function for correcting the chromatic aberration which is equivalent to that of a single radial type graded refractive index lens element having a value of $v_1$ within the above-mentioned region (b) or (c). Abbe's number of this combination lens system which is equivalent to that of the graded refractive index lens element made of the medium having the value of $v_1$ within the region (b) or (c) is expressed by the following formula (E):

$$\phi_{tm}/v_{1e} = (\phi_{pm}/v_{1p}) + (\phi_{nm}/v_{1n}) \qquad (E)$$

$$\phi_{tm} = \phi_{pm} + \phi_{nm}$$

wherein the reference symbols $v_{1p}$ and $\phi_{pm}$ represent the Abbe's number representing the paraxial chromatic aberration and the refractive power respectively of the radial type graded refractive index lens element made of the medium having the positive refractive power, and the reference symbols $v_{1n}$ and $\phi_{nm}$ designate the Abbe's number representing the paraxial chromatic aberration and the refractive index respectively of the radial type graded refractive index lens element made of the medium having the negative refractive power.

Description has been made above only on the correction of the chromatic aberration in the lens system according to the present invention.

Now, explanation will be made on a case wherein the chromatic aberration and the other aberrations are to be corrected at the same time.

When the two radial type graded refractive index lens elements made of the media having values of $v_1$ within the region (a) are combined with each other, the lens system composed of these lens elements can be regraded as a single radial type grade refractive index lens element made of a medium having a value of $v_1$ expressed by the formula (E) which is within the region (b) or (c).

Let us consider a case where the lens system composed of the two radial type graded refractive index lens elements is used as a lens unit in the lens system described in the above-mentioned literature. It is possible to correct all the aberrations favorably in the lens system described in the literature by using a pair of the lens units each of which is composed of the two radial type graded refractive index lens elements described above In this case, the lens system is composed of a first lens unit having a positive refractive power and a second lens unit having a positive refractive power, each of which consists of the radial type graded refractive index lens element made of the medium having the positive refractive power and the radial type graded refractive index lens element made of the medium having the negative refractive power. In this case, it is desirable to design the lens system so as to satisfy the following condition (4):

$$\Sigma|\phi_2|/\Sigma|\phi_m| < 0.4 \qquad (4)$$

wherein the reference symbol $\phi_s$ represents the refractive power of the surface only of each of the radial type graded refractive index lens elements, the reference symbol $\phi_m$ designates the refractive power of the medium only of each of the radial graded refractive index lens elements and the reference symbol $\Sigma$ denotes the total sum of the refractive powers.

The condition (4) is required for suppressing the refractive power of each of the lens surfaces to a low level so as to prevent remarkable aberrations from being produced. If the condition (4) is not satisfied, coma, astigmatism and distortion, especially of the high orders, will be produced excessively, thereby making it impossible to correct the aberrations with good balance in the lens system as a whole. In this case, it is desirable that each of the lens elements arranged in the first lens unit is designed as a meniscus lens element having a convex surface on the object side and each of the lens elements arranged in the second lens unit is designed as a meniscus lens element having a convex surface on the image side as in the lens system described in the above-mentioned literature. These designes of the lens elements make it possible to reduce the refractions of the offaxial ray on the lens surfaces so as to suppress productions of the offaxial aberrations such as distortion, astigmatism and coma to low levels.

When the lens system according to the present invention is composed as described above, the aberrations other than the longitudinal chromatic aberration can be corrected, without imparting so strong powers to the lens surfaces, by the method substantially the same as that adopted for the lens system described in the above-mentioned literature. Further, the longitudinal chromatic aberration can be corrected by cancelling the longitudinal chromatic aberration produced by the medium having the positive refractive power with the longitudinal chromatic aberration produced by the medium having the negative refractive power.

For the imaging lens system having the positive refractive power has been considered above, both the first lens unit and the second lens units have positive refractive powers. However, the concept of the present invention is applicable also to a lens system having a negative refractive power. A lens system having a negative refractive power is to be composed of a first lens unit having a negative refractive power and a second lens unit having a negative refractive power, each of which is to be composed of a graded refractive index lens element made of a medium having a positive refractive power and another graded refractive index lens element made of a medium having a positive refractive power. It is desirable that this lens system is also designed so as to satisfy the condition (4).

Though the foregoing description has been made on the lens systems which have unvariable or fixed focal lengths, it is possible to apply the concept of the present invention to lens units of a zoom lens system. In case of a zoom lens system, each of the lens units is to be considered basically as a lens system which has corrected aberrations and a fixed focal length. Accordingly, at least one lens unit is to be replaced with the lens system according to the present invention when the concept of the present invention is to apply to a zoom lens system. The concept of the present invention is applicable to a zoom lens system which comprises a plurality of lens units and is adapted so as to vary focal length of the lens system as a whole by moving at least one of the lens units along the optical axis, for example, by designing at least one of the lens units so as to comprise the radial graded refractive index lens element made of the medium having the positive refractive power and the radial type graded refractive index lens element made of the medium having the negative refractive power. In such a case, it will be effective to use two lens units each having the composition described above. The above-mentioned graded refractive index lens elements are also to be designed so as to satisfy the conditions (1), (2), (3) and (4).

DETAILED DESCRIPTION OF THE PREFERRED EMBODIMENTS

Now, the lens system according to the present invention will be described more detailedly below with reference to the preferred embodiments illustrated in the accompanying drawings and given in the form of the following numerical data:

---

Embodiment 1
$f = 50$,
incidence side NAO.1 (at magnification 1×)
maximum image height 21.6,
half field angle $\omega$ 12.2°

| | | |
|---|---|---|
| $r_1 = 69.5912$ | | |
| | $d_1 = 10.9223$ | $n_1$ (Graded refractive index lens 1) |
| $r_2 = 53.8570$ | | |
| | $d_2 = 5.6760$ | $n_2$ (Graded refractive index lens 2) |
| $r_3 = 43.5007$ | | |
| | $d_3 = 2.1521$ | |
| $r_4 = \infty$ (stop) | | |
| | $d_4 = 2.1521$ | |
| $r_5 = -43.5007$ | | |
| | $d_5 = 5.6760$ | $n_3$ (Graded refractive index lens 2) |
| $r_6 = -53.8570$ | | |
| | $d_6 = 10.9223$ | $n_4$ (Graded refractive index lens 1) |
| $r_7 = -69.5912$ | | |

| Graded refractive index lens 1 | | |
|---|---|---|
| | $N_0$ | $N_1$ |
| d line | 1.71850 | $-0.15650 \times 10^{-2}$ |
| C line | 1.71222 | $-0.15416 \times 10^{-2}$ |
| F line | 1.73366 | $-0.16198 \times 10^{-2}$ |
| | $\nu_0$ 33.51213 | $\nu_1$ $0.20000 \times 10^2$ |

| | $N_2$ | $N_3$ |
|---|---|---|
| d line | $0.45677 \times 10^{-7}$ | $0.35604 \times 10^{-9}$ |
| C line | $0.45677 \times 10^{-7}$ | $0.35604 \times 10^{-9}$ |
| F line | $0.45677 \times 10^{-7}$ | $0.35604 \times 10^{-9}$ |

| Graded refractive index lens 2 | | |
|---|---|---|
| | $N_0$ | $N_1$ |
| d line | 1.72151 | $0.18041 \times 10^{-2}$ |
| C line | 1.71436 | $0.17501 \times 10^{-2}$ |
| F line | 1.73904 | $0.19305 \times 10^{-2}$ |
| | $\nu_0$ 29.23460 | $\nu_1$ $0.99993 \times 10$ |

| | $N_2$ | $N_3$ |
|---|---|---|
| d line | $0.91560 \times 10^{-7}$ | $-0.18411 \times 10^{-9}$ |
| C line | $0.91560 \times 10^{-7}$ | $-0.18411 \times 10^{-9}$ |
| F line | $0.91560 \times 10^{-7}$ | $-0.18411 \times 10^{-9}$ |

$|(\phi_{pm}/\nu_{1p}) + (\phi_{nm}/\nu_{1n})| = 5 \times 10^{-4}$ (Graded refractive index lens 1), $5 \times 10^{-4}$ (Graded refractive index lens 2), $d \cdot |\phi_t| = 0$ (Graded refractive index lens 1), 0 (Graded refractive index lens 2)

---

Embodiment 2
$f = 50$, F/2.0, maximum image height 21.6
half field angle $\omega$ 23.1°

| | | |
|---|---|---|
| $r_1 = \infty$ (stop) | | |
| | $d_1 = 1.0000$ | |
| $r_2 = 76.3867$ | | |
| | $d_2 = 10.9033$ | $n_1$ (Graded refractive index lens 1) |
| $r_3 = 54.3368$ | | |
| | $d_3 = 0.5000$ | |
| $r_4 = 57.5152$ | | |
| | $d_4 = 5.6729$ | $n_2$ (Graded refractive index lens 2) |
| $r_5 = 38.0091$ | | |
| | $d_5 = 3.7230$ | |
| $r_6 = -45.9308$ | | |
| | $d_6 = 5.6691$ | $n_3$ (Graded refractive index lens 2) |
| $r_7 = -49.2255$ | | |
| | $d_7 = 0.5000$ | |
| $r_8 = -59.9930$ | | |
| | $d_8 = 10.9495$ | $n_4$ (Graded refractive index lens 1) |

-continued $r_9 = -68.3182$

Graded refractive index lens 1

| | $N_0$ | $N_1$ |
|---|---|---|
| d line | 1.74000 | $-0.15514 \times 10^{-2}$ |
| C line | 1.73318 | $-0.15281 \times 10^{-2}$ |
| F line | 1.75652 | $-0.16056 \times 10^{-2}$ |
| | $\nu_0$ 31.70523 | $\nu_1$ $0.20001 \times 10^2$ |

| | $N_2$ | $N_3$ |
|---|---|---|
| d line | $0.28806 \times 10^{-7}$ | $0.50835 \times 10^{-9}$ |
| C line | $0.28806 \times 10^{-7}$ | $0.50835 \times 10^{-9}$ |
| F line | $0.28806 \times 10^{-7}$ | $0.50835 \times 10^{-9}$ |

Graded refractive index lens 2

| | $N_0$ | $N_1$ |
|---|---|---|
| d line | 1.68893 | $0.17865 \times 10^{-2}$ |
| C line | 1.68248 | $0.17325 \times 10^{-2}$ |
| F line | 1.70465 | $0.19124 \times 10^{-2}$ |
| | $\nu_0$ 31.07488 | $\nu_1$ $0.99273 \times 10$ |

| | $N_2$ | $N_3$ |
|---|---|---|
| d line | $0.32600 \times 10^{-8}$ | $-0.86004 \times 10^{-9}$ |
| C line | $0.32600 \times 10^{-8}$ | $-0.86004 \times 10^{-9}$ |
| F line | $0.32600 \times 10^{-8}$ | $-0.86004 \times 10^{-9}$ |

$|(\phi_{pm}/\nu_{1p}) + (\phi_{nm}/\nu_{1n})| = 4 \times 10^{-4}$ (Graded refractive index lens 1), $4 \times 10^{-4}$ (Graded refractive index lens 2), $d \cdot |\phi_t| = 0.006$ (Graded refractive index lens 1), 0.009 (Graded refractive index lens 2)

---

Embodiment 3
$f = 50$, F/2.8, maximum image height 21.6
half field angle $\omega$ 23.0°

| | | |
|---|---|---|
| $r_1 = 79.4113$ | | |
| | $d_1 = 6.5873$ | $n_1$ (Graded refractive index lens 1) |
| $r_2 = 56.3372$ | | |
| | $d_2 = 11.0026$ | $n_2$ (Graded refractive index lens 2) |
| $r_3 = 42.0864$ | | |
| | $d_3 = 2.0314$ | |
| $r_4 = \infty$ (stop) | | |
| | $d_4 = 1.9472$ | |
| $r_5 = -34.4275$ | | |
| | $d_5 = 10.8626$ | $n_3$ (Graded refractive index lens 2) |
| $r_6 = -41.7402$ | | |
| | $d_6 = 7.6059$ | $n_4$ (Graded refractive index lens 1) |
| $r_7 = -131.6510$ | | |

Graded refractive index lens 1

| | $N_0$ | $N_1$ |
|---|---|---|
| d line | 1.69895 | $0.10546 \times 10^{-2}$ |
| C line | 1.69223 | $0.10213 \times 10^{-2}$ |
| F line | 1.71543 | $0.11323 \times 10^{-2}$ |
| | $\nu_0$ 30.12716 | $\nu_1$ $0.94950 \times 10$ |

| | $N_2$ | $N_3$ |
|---|---|---|
| d line | $0.36272 \times 10^{-6}$ | $0.14640 \times 10^{-8}$ |
| C line | $0.36272 \times 10^{-6}$ | $0.14640 \times 10^{-8}$ |
| F line | $0.36272 \times 10^{-6}$ | $0.14640 \times 10^{-8}$ |

Graded refractive index lens 2

| | $N_0$ | $N_1$ |
|---|---|---|
| d line | 1.74000 | $-0.16728 \times 10^{-2}$ |
| C line | 1.73318 | $-0.16478 \times 10^{-2}$ |
| F line | 1.75652 | $-0.17314 \times 10^{-2}$ |
| | $\nu_0$ 31.70523 | $\nu_1$ $0.19999 \times 10^2$ |

| | $N_2$ | $N_3$ |
|---|---|---|
| d line | $-0.34967 \times 10^{-6}$ | $0.65390 \times 10^{-9}$ |
| C line | $-0.34967 \times 10^{-6}$ | $0.65390 \times 10^{-9}$ |
| F line | $-0.34967 \times 10^{-6}$ | $0.65390 \times 10^{-9}$ |

$|(\phi_{pm}/\nu_{1p}) + (\phi_{nm}/\nu_{1n})| = 3 \times 10^{-4}$ (Graded refractive index lens 1), $1 \times 10^{-4}$ (Graded refractive index lens 2), -continued $d \cdot |\phi_t| = 0$ (Graded refractive index lens 1), 0 (Graded refractive index lens 2)

---

Embodiment 4
$f = 73.45 \sim 100 \sim 138.3$, F/2.8
maximum image height 21.6
half field angle $\omega$ 17.2° $\sim$ 12.3° $\sim$ 8.7°

| | | | |
|---|---|---|---|
| $r_1 = 127.2820$ | | | |
| | $d_1 = 5.7700$ | $n_1 = 1.62041$ | $\nu_1 = 60.27$ |
| $r_2 = -354.5860$ | | | |
| | $d_2 = 0.3400$ | | |
| $r_3 = 110.6400$ | | | |
| | $d_3 = 6.0700$ | $n_2 = 1.62041$ | $\nu_2 = 60.27$ |
| $r_4 = -277.4640$ | | | |
| | $d_4 = 3.7800$ | $n_3 = 1.75520$ | $\nu_3 = 27.51$ |
| $r_5 = 187.2330$ | | | |
| | $d_5 = D_1$ (variable) | | |
| $r_6 = -158.1280$ | | | |
| | $d_6 = 2.1000$ | $n_4 = 1.50378$ | $\nu_4 = 66.81$ |
| $r_7 = 48.3100$ | | | |
| | $d_7 = 5.7700$ | | |
| $r_8 = -62.3110$ | | | |
| | $d_8 = 2.1000$ | $n_5 = 1.48749$ | $\nu_5 = 70.15$ |
| $r_9 = 47.3540$ | | | |
| | $d_9 = 3.7800$ | $n_6 = 1.80518$ | $\nu_6 = 25.43$ |
| $r_{10} = 118.9950$ | | | |
| | $d_{10} = D_2$ (variable) | | |
| $r_{11} = 89.1420$ | | | |
| | $d_{11} = 2.8900$ | $n_7 = 1.84666$ | $\nu_7 = 23.88$ |
| $r_{12} = 56.4000$ | | | |
| | $d_{12} = 5.2700$ | $n_8 = 1.57135$ | $\nu_8 = 52.92$ |
| $r_{13} = -217.4500$ | | | |
| | $d_{13} = D_3$ (variable) | | |
| $r_{14} = \infty$ (stop) | | | |
| | $d_{14} = 1.2000$ | | |
| $r_{15} = 65.1424$ | | | |
| | $d_{15} = 18.2348$ | $n_9$ (Graded refractive index lens 1) | |
| $r_{16} = 131.0159$ | | | |
| | $d_{16} = 9.4960$ | $n_{10}$ (Graded refractive index lens 2) | |
| $r_{17} = 402.3354$ | | | |
| | $d_{17} = 10.4179$ | | |
| $r_{18} = -400.1030$ | | | |
| | $d_{18} = 14.0158$ | $n_{11}$ (Graded refractive index lens 3) | |
| $r_{19} = -162.8357$ | | | |
| | $d_{19} = 18.2796$ | $n_{12}$ (Graded refractive index lens 4) | |
| $r_{20} = -339.5661$ | | | |

| f | 73.45 | 100 | 138.3 |
|---|---|---|---|
| $D_1$ | 8.765 | 23.818 | 35.667 |
| $D_2$ | 32.712 | 20.265 | 1.529 |
| $D_3$ | 5.118 | 2.512 | 9.399 |

Graded refractive index lens 1

| | $N_0$ | $N_1$ |
|---|---|---|
| d line | 1.74000 | $-0.27462 \times 10^{-3}$ |
| C line | 1.73318 | $-0.27005 \times 10^{-3}$ |
| F line | 1.75652 | $-0.28530 \times 10^{-3}$ |
| | $\nu_0$ 31.70523 | $\nu_1$ $0.18000 \times 10^2$ |

| | $N_2$ | $N_3$ |
|---|---|---|
| d line | $-0.57060 \times 10^{-7}$ | $0.14334 \times 10^{-9}$ |
| C line | $-0.57060 \times 10^{-7}$ | $0.14334 \times 10^{-9}$ |
| F line | $-0.57060 \times 10^{-7}$ | $0.14334 \times 10^{-9}$ |

Graded refractive index lens 2

| | $N_0$ | $N_1$ |
|---|---|---|
| d line | 1.69895 | $0.51764 \times 10^{-3}$ |
| C line | 1.69223 | $0.50157 \times 10^{-3}$ |
| F line | 1.71543 | $0.55514 \times 10^{-3}$ |
| | $\nu_0$ 30.12716 | $\nu_1$ $0.96628 \times 10$ |

-continued

| | $N_2$ | $N_3$ |
|---|---|---|
| d line | $-0.19520 \times 10^{-6}$ | $-0.89266 \times 10^{-9}$ |
| C line | $-0.19520 \times 10^{-6}$ | $-0.89266 \times 10^{-9}$ |
| F line | $-0.19520 \times 10^{-6}$ | $-0.89266 \times 10^{-9}$ |

Graded refractive index lens 3

| | $N_0$ | $N_1$ |
|---|---|---|
| d line | 1.69895 | $0.30324 \times 10^{-3}$ |
| C line | 1.69223 | $0.29442 \times 10^{-3}$ |
| F line | 1.71543 | $0.32383 \times 10^{-3}$ |
| | $\nu_0$ 30.12716 | $\nu_1$ $0.10309 \times 10^2$ |

| | $N_2$ | $N_3$ |
|---|---|---|
| d line | $0.75830 \times 10^{-6}$ | $0.12397 \times 10^{-8}$ |
| C line | $0.75830 \times 10^{-6}$ | $0.12397 \times 10^{-8}$ |
| F line | $0.75830 \times 10^{-6}$ | $0.12397 \times 10^{-8}$ |

Graded refractive index lens 4

| | $N_0$ | $N_1$ |
|---|---|---|
| d line | 1.74000 | $-0.30505 \times 10^{-3}$ |
| C line | 1.73318 | $-0.29933 \times 10^{-3}$ |
| F line | 1.75652 | $-0.31839 \times 10^{-3}$ |
| | $\nu_0$ 31.70523 | $\nu_1$ $0.16000 \times 10^2$ |

| | $N_2$ | $N_3$ |
|---|---|---|
| d line | $-0.22875 \times 10^{-6}$ | $-0.15375 \times 10^{-9}$ |
| C line | $-0.22875 \times 10^{-6}$ | $-0.15375 \times 10^{-9}$ |
| F line | $-0.22875 \times 10^{-6}$ | $-0.15375 \times 10^{-9}$ |

$|(\phi_{pm}/\nu_{1p}) + (\phi_{nm}/\nu_{1n})| = 5 \times 10^{-4}$ (Graded refractive index lens 1), $2 \times 10^{-4}$ (Graded refractive index lens 2), $d \cdot |\phi_t| = 0$ (Graded refractive index lens 1), 0 (Graded refractive index lens 2)

wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers of the respective lens elements.

Figure 1:
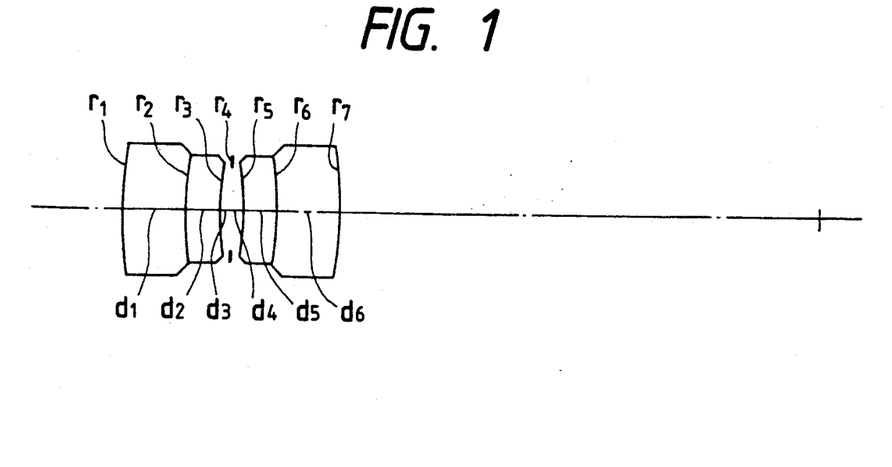
FIG. 1 through FIG. 4 show sectional views illustrating compositions of Embodiments 1 through 4 of the lens system according to the present invention.

The Embodiment 1 has the composition illustrated in FIG. 1, which is preferred as an example to apply the concept of the present invention to a photographic lens system.

In this embodiment, two lens units, each of which is composed of two radial type graded refractive index lens elements made of the media having the positive refractive power and the negative refractive power respectively, are arranged symmetrically with regard to an aperture stop. Speaking more concretely, the Embodiment 1 comprises, in the order from the object side, a radial type graded refractive index lens element made of the medium having the positive refractive power, a radial type graded refractive index lens element made of the medium having the negative refractive power, an aperture stop, a radial type graded refractive index lens element made of the medium having the negative refractive power and a radial type graded refractive index lens element made of the medium having the positive refractive power. Therefore, the Embodiment 1 comprises four lens elements in total.

Further, the Embodiment 1 is designed for a standard imaging magnification of 1× and comprises the lens elements which are arranged perfectly symmetrically with regard to the apertuer stop. Accordingly, aberrations, especially coma, are corrected favorably in the Embodiment 1. The longitudinal chromatic aberration is corrected by cancelling the longitudinal chromatic aberration produced by the medium having the positive refractive power with that produced by the medium having the negative refractive power, whereas the other aberrations are corrected by the method which is substantially the same as that described in the above-mentioned literature.

The Embodiment 1 which comprises the four lens elements has aberrations corrected as favorably as those in the conventional lens system which is composed of six lens elements.

Figure 5:
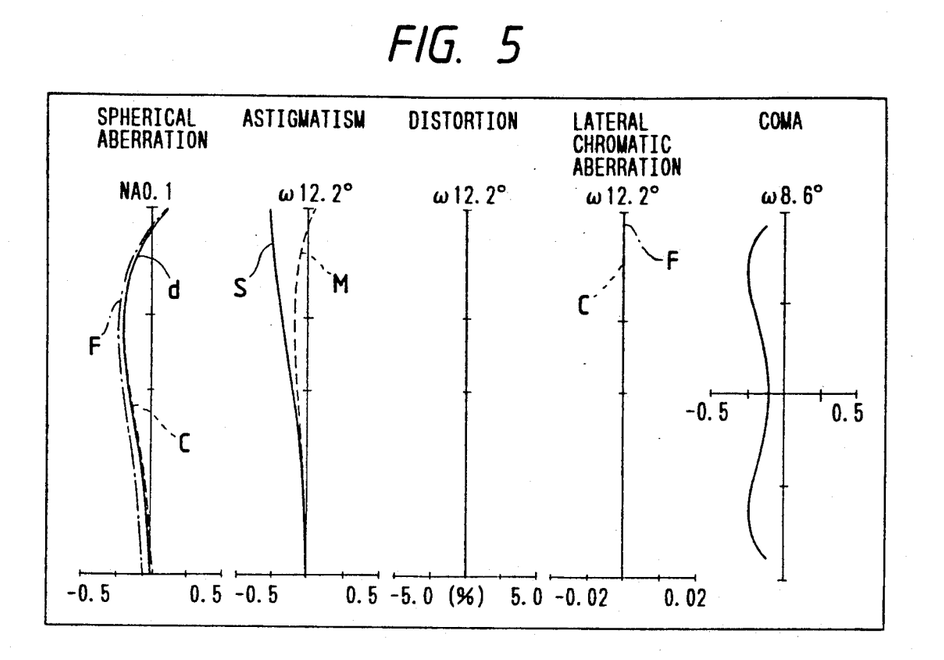
FIG. 5 through FIG. 7 show graphs illustrating aberration characteristics of the Embodiments 1 through 3 respectively of the present invention.

Aberration characteristics of the Embodiment 1 are illustrated in FIG. 5.

Figure 2:
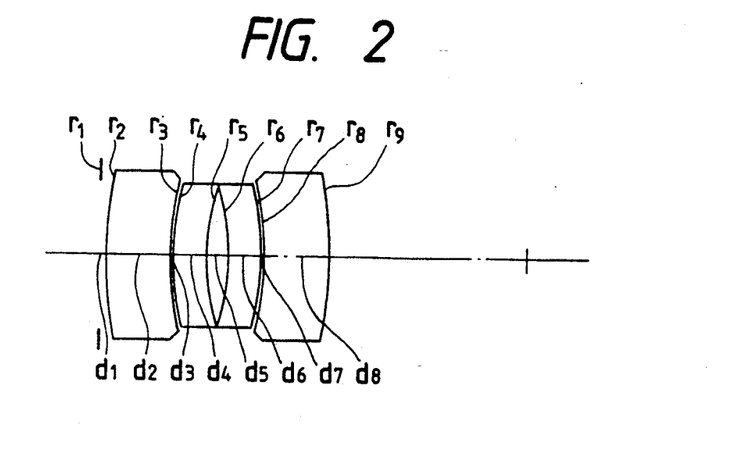

The Embodiment 2 has the composition illustrated in FIG. 2, which is perferred as another example to apply the concept of the present invention to a photographic lens system.

The Embodiment 2 comprises, on the image side of an aperture stop, two lens unit each consisting of a combination of a radial type graded refractive index lens element made of the medium having the positive refractive power and the radial type graded refractive index lens element made of the medium having the negative refractive power. Speaking more concretely, the Embodiment 2 comprises, in the order from the object side, an aperture stop, a radial type graded refractive index lens element made of the medium having the positive refractive power, a graded refractive index lens element made of the medium having the negative refractive power, a graded refractive index lens element made of the medium having the negative refractive power and a graded refractive index lens element made of the medium having the positive refractive power. The Embodiment 2 is composed of four lens elements in total.

The Embodiment 2 is designed for a standard object point located at infinite distance and uses two types of graded refractive index lens elements. Further, the Embodiment 2 has the composition which is not perfectly symmetrical but almost symmetrical, and has aberrations favorably corrected. Furthermore, the composition which locates the aperture stop outside the lens system is effective for preventing the lens elements from being eccentric.

The Embodiment 2 which consists of the four lens elements has optical performance equivalent to that of the conventional lens system which is composed of six of seven lens elements.

Figure 6:
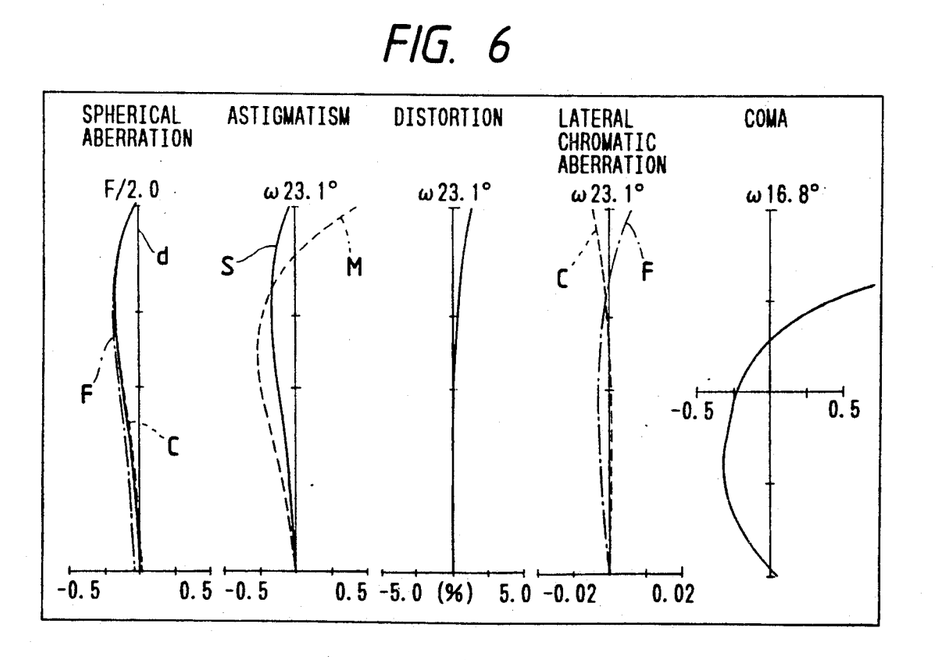

Aberration characteristics of the Embodiment 2 are illustrated in FIG. 6.

Figure 3:
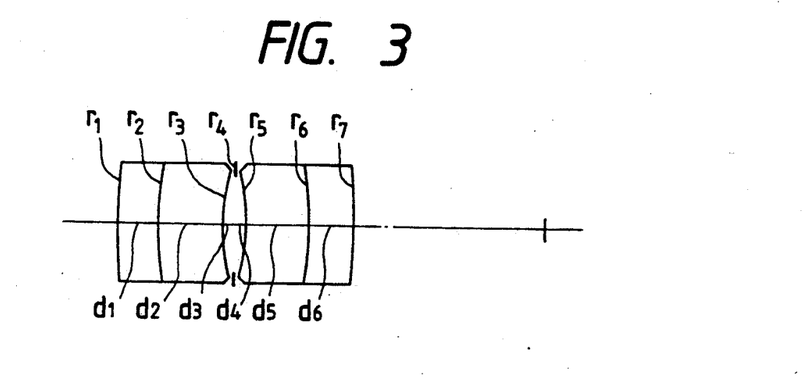

The Embodiment 3 has the composition illustrated in FIG. 3, which is perferred as a further example to apply the concept of the present invention to a photographic lens system.

This embodiment comprises, at locations symmetrical with regard to an aperture stop, two lens units each of which is composed of a radial type graded refractive index lens element made of the medium having the positive refractive power and a radial type graded refractive index lens element made of the medium having the negative refractive power. Speaking more concretely, the Embodiment 3 comprises, in the order from the object side, a cemented doublet consisting of a radial type graded refractive index lens element made of the medium having the negative refractive power and a radial type graded refractive index lens element made of the medium having the positive refractive power, an aperture stop, and a cemented doublet consisting of a radial type graded refractive index lens element made of the medium having the positive refractive power and a radial type graded refractive index lens element made of the medium having the negative refractive power The Embodiment 3 comprises four lens elements in total.

The Embodiment 3 is designed for a standard object point located at infinite distance and uses two types of graded refractive index lens elements. Further, the Embodiment 3 has the composition which is no perfectly symmetrical but almost symmetrical, and favorably corrected aberrations.

Figure 7:
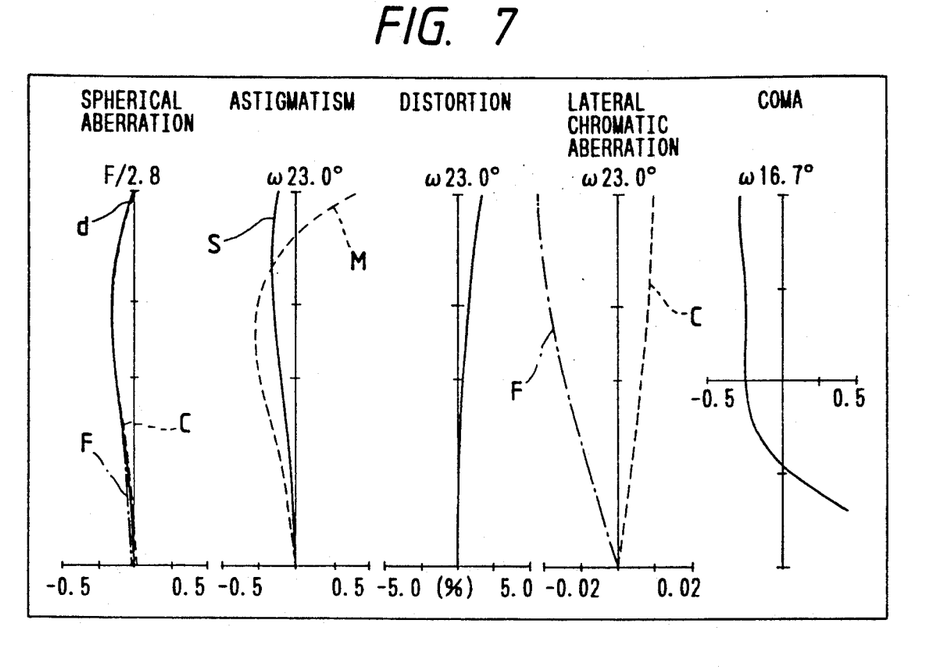
Figure 8:
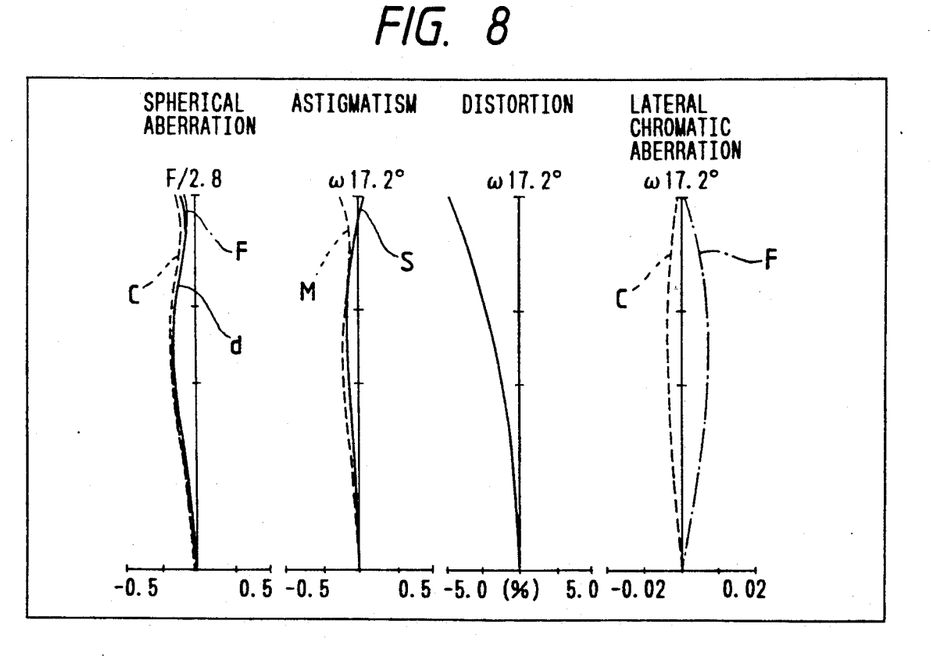
FIG. 8 shows graphs illustrating aberration characteristics at the wide position of the Embodiment 4 of the present invention.
Figure 9:
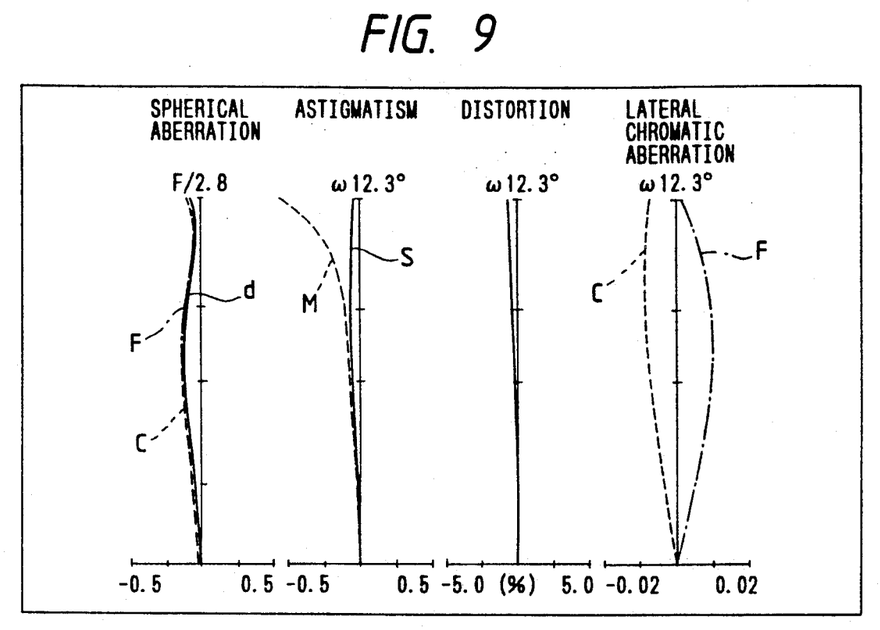
FIG. 9 shows curves illustrating aberration characteristics at the intermediate focal length of the Embodiment 4 of the present invention.
Figure 10:
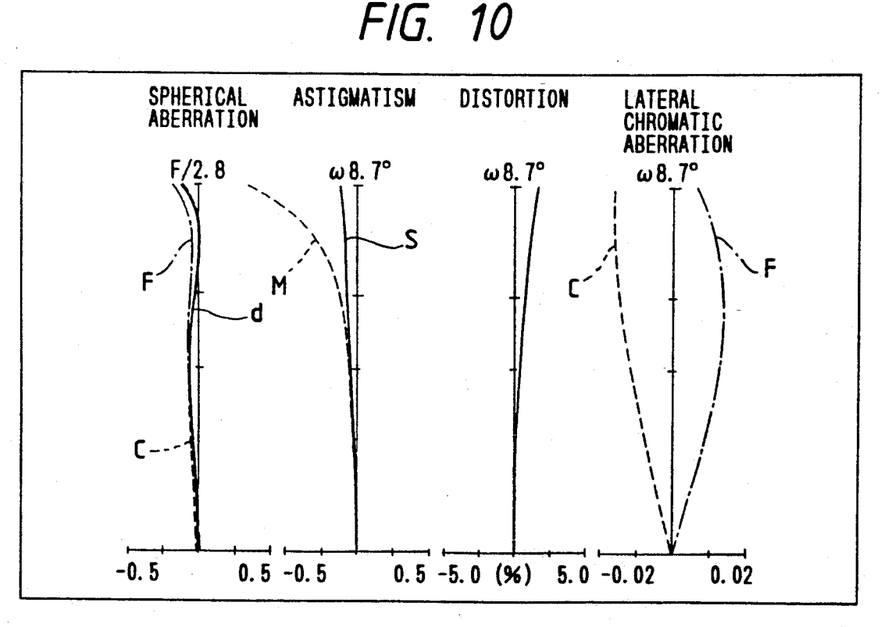
FIG. 10 shows cures illustrating aberration characteristics at the tele position of the Embodiment 4 of the present invention.

The Embodiment 3 which comprises the four lens elements has optical performance equivalent to that of the conventional lens system which comprises six or seven lens elements. Aberration characteristics of the Embodiment 3 for an object located at infinite distance are visualized in FIG. 7.

Figure 4:
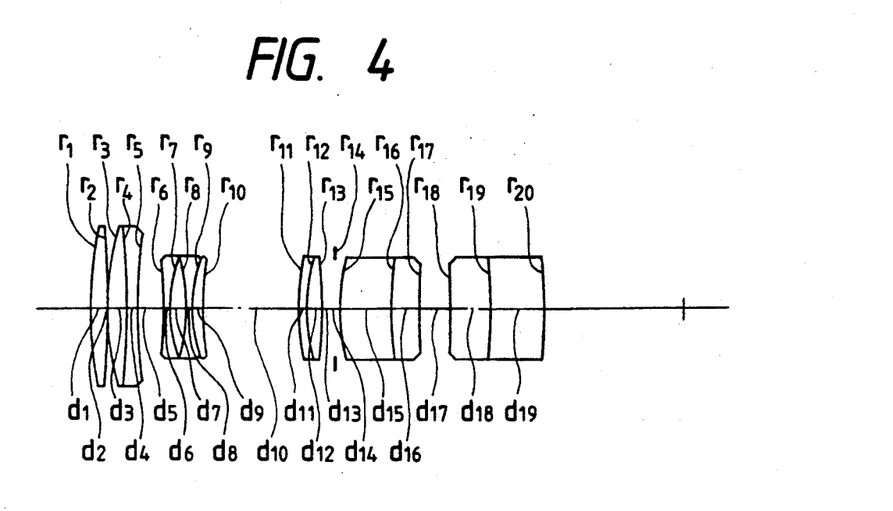

The Embodiment 4 has the composition illustrated in FIG. 4, which is perferred as an example to apply the concept of the present invention to a zoom lens system. The zoom lens system perferred as the Embodiment 4 of the present invention comprises, in the order from the object side, a first lens unit having a positive refractive power, a second lens unit having a negative refractive power, a third lens unit having a positive refractive power and a fourth lens unit having a positive refractive power. In the Embodiment 4, the fourth lens unit comprises two pairs of a radial type graded refractive index lens element made of the medium having the positive refractive power and a radial type graded refractive index lens element made of the medium having the negative refractive power. Speaking more concretely, the fourth lens unit comprises, in the order from the object side, an aperture stop, a cemented doublet consisting of a radial type graded refractive index lens element made of the medium having the positive refractive power and a radial type graded refractive index lens element made of the medium having the negative refractive power, and a cemented doublet consisting of a radial type graded refractive index lens element made of the medium having negative refractive power and a radial type graded refractive index lens element made of the medium having the positive refractive power. The fourth lens unit comprises four lens elements in total. Each of the graded refractive index lens elements has a refractive index distribution which is different from that of any other graded refractive index lens element.

By using the combinations of the radial type graded refractive index lens element made of the medium having the positive refractive power and the graded refractive index lens element made of the medium having the negative refractive power as described above, it is possible to obtain the fourth lens unit which has favorably corrected aberrations, is composed of four lens elements and has optical performance equivalent to that of the conventional fourth lens unit composed of six or seven lens elements.

In the embodiments of the present invention described above, the concept of the present invention is applied to lens systems having positive refractive powers or a lens unit having a positive refractive power as a whole, but it is also possible to apply the concept of the present invention to lens systems or lens units which have negative refractive powers such as rear converter lens systems and variators of zoom lens systems.

As is understood from the foregoing description, the present invention makes it possible to design lens system having chromatic aberration and the other aberrations which are corrected favorably by using radial type graded refractive index lens elements made of materials easily preparable.

We claim:

1. A lens system comprising a first lens unit and a second lens unit, each consisting of a radial type graded refractive index lens element made of a medium having a positive refractive power and a radial type graded refractive index lens element made of a medium having a negative refractive power; each of said graded refractive index lens elements being designed so as to satisfy the following condition (1):

$$0 < v_1 < v_0 \tag{1}$$

wherein the reference symbols $v_1$ and $v_0$ represent the coefficient representing dispersing power and axial Abbe's number respectively of said graded refractive index lens element.

2. A lens system according to claim 1 wherein said second lens unit has a positive refractive power and each of said graded refractive index lens elements is designed so as to satisfy the following conditions (2), (3) and (4):

$$|(\phi_{pm}/v_{1p}) + (\phi_{nm}/v_{1n})|/|\phi_t| < 0.1 \tag{2}$$

$$d \cdot |\phi_t| < 0.1 \tag{3}$$

$$\Sigma|\phi_s|/\Sigma|\phi_m| < 0.4 \tag{4}$$

wherein the reference symbol $\phi_{pm}$ represents the refractive power of the medium of the radial type graded refractive index lens element made of the medium having the positive refractive power, the reference symbol $\phi_{nm}$ designates the refractive power of the medium of the graded refractive index lens element made of the medium having the negative refractive power, the reference symbol $\phi_t$ denotes the refractive power of said first lens unit or said second lens unit, the reference symbol $v_{1p}$ represents the coefficient representing the dispersing power of the graded refractive index lens element made of the medium having the positive refractive power, the reference symbol $v_{1n}$ designates the coefficient representing the dispersing power of the graded refractive index lens element made of the medium having the negative refractive power, the reference symbol $\phi_s$ denotes the refractive power of the surface of each of the graded refractive index lens element, and the reference symbol $\phi_m$ represents the refractive power of the medium of each of the graded refractive index lens elements.

3. A vari-focal lens system comprising a plurality of lens units and adapted so as to vary focal length by moving at least one of said lens units along the optical axis; at least one of said lens units consisting of a first lens component and a second lens component, each consisting of a radial type graded refractive index lens element made of a medium having a positive refractive power and a radial type graded refractive index lens element made of a medium having a negative refractive power, and each of said graded refractive index lens elements being designed so as to satisfy the following condition (1):

$$0 < v_1 < v_0 \tag{1}$$

wherein the reference symbol $v_1$ and $v_0$ represent the coefficient representing the dispersing power of said graded refractive index lens element.

4. A vari-focal lens system according to claim 3 wherein said second lens component has a positive refractive power and each of said graded refractive index lens elements is designed so as to satisfy the following conditions (2), (3) and (4):

$$|(\phi_{pm}/\nu_{1p})+(\phi_{nm}/\nu_{1n})|/|\phi_t| < 0.1 \qquad (2)$$

$$d \cdot |\phi_t| < 0.1 \qquad (3)$$

$$\Sigma|\phi_s|/\Sigma|\phi_m| < 0.4 \qquad (4)$$

wherein the reference symbol $\phi_{pm}$ represents the refractive power of the medium of the graded refractive index lens element made of the medium having the positive refractive power, the reference symbol $\phi_{nm}$ designates the refractive power of the medium of the graded refractive index lens element made of the medium having the negative refractive power, the reference symbol $\phi_t$ denotes the total refractive power of said first lens component or said second lens component, the reference symbol $\nu_{1p}$ represents the coefficient representing the dispersing power of the graded refractive index lens element made of the medium having the positive refractive power, the reference symbol $\nu_{1n}$ designates the coefficient representing the dispersing power of the graded refractive index lens element made of the medium having the negative refractive power, the reference symbol $\phi_s$ denotes the refractive power of the surface of each of the graded refractive index lens elements and the reference symbol $\phi_m$ represents the refractive power of the medium of each of the graded refractive lens elements.

* * * * *